United States Patent
Bayless

(10) Patent No.: US 11,675,570 B2
(45) Date of Patent: *Jun. 13, 2023

(54) SYSTEM AND METHOD FOR USING A GRAPHICAL USER INTERFACE TO DEVELOP A VIRTUAL PROGRAMMABLE LOGIC CONTROLLER

(71) Applicant: PROGRAMMABLE LOGIC CONSULTING, LLC, Bozeman, MT (US)

(72) Inventor: Harold Bayless, Bozeman, MT (US)

(73) Assignee: Programmable Logic Consulting, LLC, Bozeman, MT (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/582,622

(22) Filed: Jan. 24, 2022

(65) Prior Publication Data

US 2022/0147323 A1    May 12, 2022

Related U.S. Application Data

(63) Continuation of application No. 17/185,226, filed on Feb. 25, 2021, now Pat. No. 11,231,911.

(Continued)

(51) Int. Cl.
*G06F 3/0482* (2013.01)
*G06F 8/34* (2018.01)
(Continued)

(52) U.S. Cl.
CPC ............ *G06F 8/34* (2013.01); *G06F 3/0482* (2013.01); *G06F 3/0486* (2013.01); *G06F 8/41* (2013.01); *G06F 8/447* (2013.01)

(58) Field of Classification Search
CPC ............ G03F 7/0037; G03F 7/70416; G03F 7/70375; B33Y 10/00; B33Y 30/00;
(Continued)

(56) References Cited

U.S. PATENT DOCUMENTS 8,060,834 B2    11/2011 Lucas et al.
2003/0167096 A1    9/2003 Nakai
(Continued)

FOREIGN PATENT DOCUMENTS

WO    199119237 A1    12/1991

OTHER PUBLICATIONS

International Searching Authority, PCT International Search Report and Written Opinion for PCT Application No. PCT/US2022/017702, dated May 5, 2022, 16 pages.

*Primary Examiner* — Rayeez R Chowdhury
(74) *Attorney, Agent, or Firm* — Dickinson Wright PLLC; Stephen A. Mason; Jonathan H. Harder

(57) ABSTRACT

In one embodiment, a method for developing a virtual programmable logic controller (PLC) application using a graphical user interface (GUI) is disclosed. The method including receiving, from a first portion of the GUI representing a tool box, a first selection of a first object from a set of objects represented in the GUI, wherein each of the set of objects performs a respective function. The method also includes inserting, into a horizontal section of a second portion of the GUI representing the virtual PLC application, the first object, wherein the horizontal section includes a second object that executes simultaneously as the first object in the horizontal section. The method also includes compiling code implementing the first object and the second object to generate the virtual PLC application, and adding a shortcut of the virtual PLC application to a virtual tray of an operating system.

20 Claims, 8 Drawing Sheets

Related U.S. Application Data

(60) Provisional application No. 63/023,630, filed on May 12, 2020.

(51) Int. Cl.
 *G06F 8/41* (2018.01)
 *G06F 3/0486* (2013.01)

(58) Field of Classification Search
 CPC ......... B33Y 50/02; B33Y 50/00; B33Y 40/20; B33Y 40/00; B33Y 70/00; G05B 2219/49013; G05B 2219/49017; G05B 19/418; G05B 2219/40168; G05B 2219/49015; G05B 2219/49039; G06F 3/0481; G06F 3/04817; G06F 2203/04803; G06F 3/0482; G06F 3/0487; G06F 3/04886; G06F 9/451; G06F 3/0483; G06F 8/38; G06F 9/4818; G06F 9/485
 See application file for complete search history.

(56) References Cited

U.S. PATENT DOCUMENTS

| | | | |
|---|---|---|---|
| 2007/0067053 A1 | 3/2007 | Menzl et al. | |
| 2008/0046755 A1* | 2/2008 | Hayes | G06F 21/33 713/187 |
| 2010/0088597 A1* | 4/2010 | Shin | G06F 8/38 715/867 |
| 2011/0179376 A1 | 7/2011 | Berestov et al. | |
| 2020/0310377 A1 | 10/2020 | Onose | |
| 2022/0147323 A1* | 5/2022 | Bayless | G06F 8/41 |

\* cited by examiner

SYSTEM AND METHOD FOR USING A GRAPHICAL USER INTERFACE TO DEVELOP A VIRTUAL PROGRAMMABLE LOGIC CONTROLLER

CROSS-REFERENCE TO RELATED APPLICATIONS

The present application is a continuation of and claims priority to U.S. patent application Ser. No. 17/185,226, titled "SYSTEM AND METHOD FOR USING A GRAPHICAL USER INTERFACE TO DEVELOP A VIRTUAL PROGRAMMABLE LOGIC CONTROLLER", filed Feb. 25, 2021, which claims priority to and the benefit of U.S. Provisional Application No. 63/023,630, titled "SYSTEM AND METHOD FOR USING A GRAPHICAL USER INTERFACE TO DEVELOP A VIRTUAL PROGRAMMABLE LOGIC CONTROLLER", filed May 12, 2020, the contents of which are incorporated herein by reference in their entirety for all purposes.

TECHNICAL FIELD

This disclosure relates to a programmable logic controller. More specifically, this disclosure relates to a system and method for using a graphical user interface to develop a virtual programmable logic controller.

BACKGROUND

Programmable logic controllers (PLCs) may be digital computers that have been ruggedized and adapted for the control of manufacturing processes, such as assembly lines, or robotic devices, or any suitable activity that calls for high reliability, and process fault diagnosis. Software applications may be developed for the PLCs to control the operation of the PLCs. The PLCs may be connected to sensors and actuators of a machine.

PLC input may include simple digital elements such as limit switches, analog variables from process sensors (such as temperature and pressure), and more complex data such as that from positioning or machine vision systems. PLC output can include elements such as indicator lamps, sirens, electric motors, pneumatic or hydraulic cylinders, magnetic relays, solenoids, or analog outputs. The input/output arrangements may be built into a simple PLC, or the PLC may have external I/O modules attached to a fieldbus or computer network that plugs into the PLC.

In some scenarios, a PLC may be used to emulate functions of electro-mechanical relays. In an electro-mechanical relay wiring diagram, a group of contacts controlling one coil is called a "rung" of a "ladder diagram", and this concept is also used to describe PLC logic. Some models of PLC limit the number of series and parallel instructions in one "rung" of logic. The output of each rung sets or clears a storage bit, which may be associated with a physical output address or which may be an "internal coil" with no physical connection. Such internal coils can be used, for example, as a common element in multiple separate rungs. Some PLCs enforce a strict left-to-right, top-to-bottom execution order for evaluating the rung logic.

SUMMARY

Representative embodiments set forth herein disclose various techniques for enabling a system and method for management system data aggregation and transformation using client-specific criteria.

In one embodiment, a method for developing a virtual programmable logic controller (PLC) application using a graphical user interface (GUI) is disclosed. The method including receiving, from a first portion of the GUI representing a tool box, a first selection of a first object from a set of objects represented in the GUI, wherein each of the set of objects performs a respective function. The method also includes inserting, into a horizontal section of a second portion of the GUI representing the virtual PLC application, the first object, wherein the horizontal section includes a second object that executes simultaneously as the first object in the horizontal section. The method also includes compiling code implementing the first object and the second object to generate the virtual PLC application, and adding a shortcut of the virtual PLC application to a virtual tray of an operating system.

In some embodiments, a tangible, non-transitory computer-readable medium storing instructions that, when executed, cause a processing device to perform one or more of the operations described above. In some embodiments, a system may include a memory storing instructions and a processor communicatively coupled to the memory. The processor may execute the instructions to perform one or more of the operations described above.

Other technical features may be readily apparent to one skilled in the art from the following figures, descriptions, and claims.

BRIEF DESCRIPTION OF THE DRAWINGS

For a detailed description of example embodiments, reference will now be made to the accompanying drawings in which.

NOTATION AND NOMENCLATURE

Figure 1:
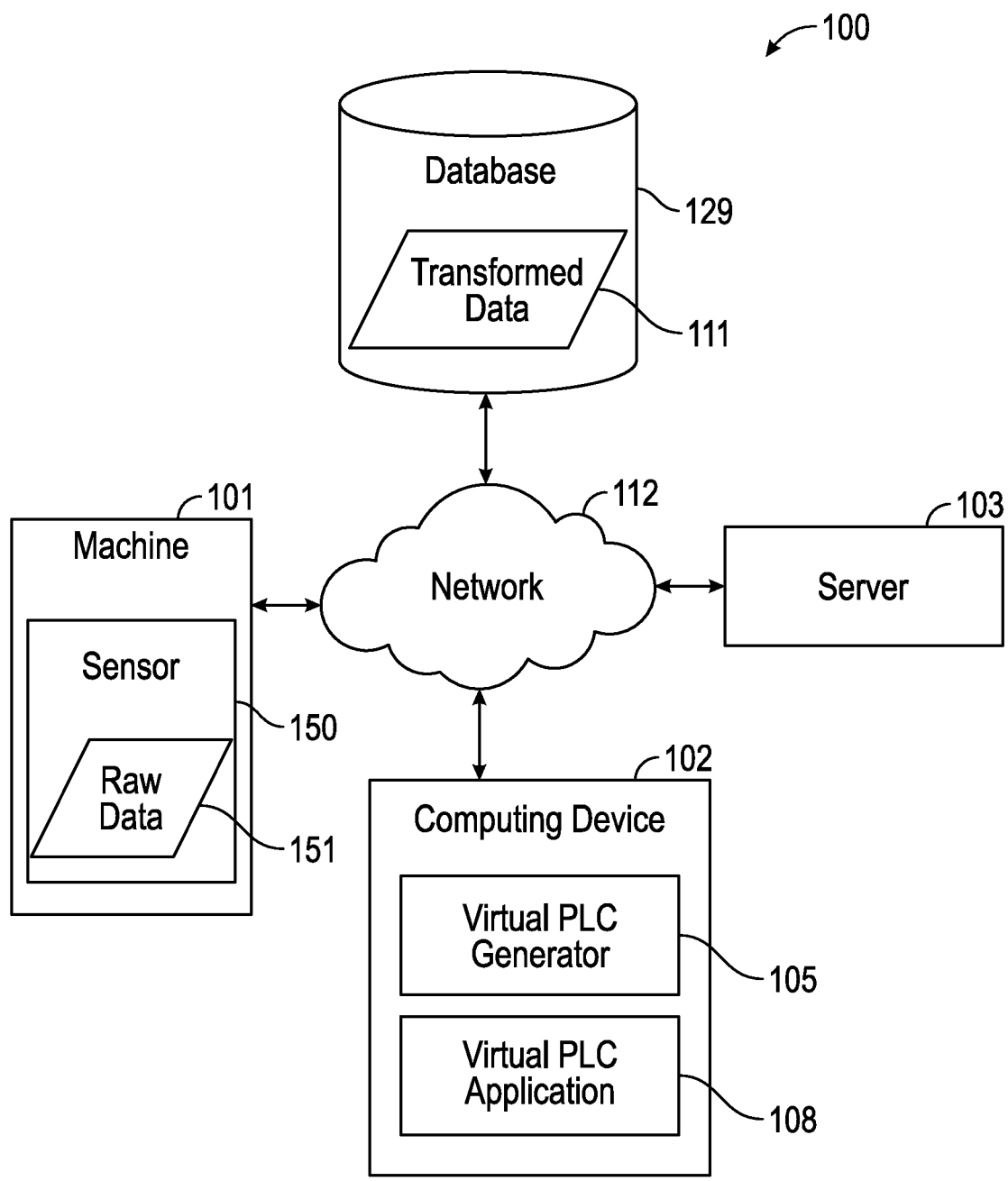
FIG. 1 illustrates a high-level component diagram of an illustrative system architecture according to certain embodiments of this disclosure.

Various terms are used to refer to particular system components. Different entities may refer to a component by different names—this document does not intend to distinguish between components that differ in name but not function. In the following discussion and in the claims, the terms "including" and "comprising" are used in an openended fashion, and thus should be interpreted to mean "including, but not limited to . . . ." Also, the term "couple" or "couples" is intended to mean either an indirect or direct connection. Thus, if a first device couples to a second device, that connection may be through a direct connection or through an indirect connection via other devices and connections.

The terminology used herein is for the purpose of describing particular example embodiments only, and is not intended to be limiting. As used herein, the singular forms "a," "an," and "the" may be intended to include the plural forms as well, unless the context clearly indicates otherwise. The method steps, processes, and operations described herein are not to be construed as necessarily requiring their performance in the particular order discussed or illustrated, unless specifically identified as an order of performance. It is also to be understood that additional or alternative steps may be employed.

The terms first, second, third, etc. may be used herein to describe various elements, components, regions, layers and/or sections; however, these elements, components, regions, layers and/or sections should not be limited by these terms. These terms may be only used to distinguish one element, component, region, layer or section from another region, layer or section. Terms such as "first," "second," and other numerical terms, when used herein, do not imply a sequence or order unless clearly indicated by the context. Thus, a first element, component, region, layer or section discussed below could be termed a second element, component, region, layer or section without departing from the teachings of the example embodiments. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C. In another example, the phrase "one or more" when used with a list of items means there may be one item or any suitable number of items exceeding one.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), solid state drives (SSDs), flash memory, or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

The term "raw data" may refer to data stored in a first format by a sensor at a machine.

The term "transformed data" may refer to data transformed to a second format by a virtual programmable logic controller application.

Definitions for other certain words and phrases are provided throughout this patent document. Those of ordinary skill in the art should understand that in many if not most instances, such definitions apply to prior as well as future uses of such defined words and phrases.

DETAILED DESCRIPTION

Developing applications to control PLCs may be technically challenging due to the order of execution that PLCs often exhibit. For example, PLCs may execute top-to-bottom and left-to-right. Controlling and enforcing objects to perform functions in such an execution order can lead to inefficiencies such as problems with compilation that waste computing resources (e.g., processing, memory, network bandwidth). Also, there are often tasks that are highly repetitive and cumbersome to perform for a computer if not performed in a proper order. It may be desirable to provide a technical solution to overcome these technical problems by providing a way to generate virtual PLC applications to perform the tasks as desired in the top-to-bottom and left-to-right execution order exhibited by PLCs.

Accordingly, the disclosed embodiments relate to systems and methods for using an enhanced graphical user-interface (GUI) of a virtual PLC generator to develop a virtual PLC application. The enhanced GUI may include at least two portions. The first portion of the GUI may include a toolbox of numerous objects that implement various programmable functions and logic. The second portion of the GUI may include an area for adding the objects from the toolbox and the area may represent the virtual PLC application. The area may include a vertical section for adding objects to execute top-to-bottom, and a horizontal section that is encapsulated in the vertical section. The horizontal section may be an object. The objects in the horizontal section execute left-to-right. The objects may compile and execute simultaneously in the horizontal section and the objects in the vertical section may execute sequentially.

In some embodiments, there may be multiple objects (e.g., tools) that perform specific, repetitive programmable functions and logic. The virtual PLC application may be included as part of a workbench with multiple other virtual PLC applications. In some embodiments, the workbench may be used to select a first virtual PLC application containing first objects and include the virtual PLC application as a second object in a second virtual PLC application containing other second objects. Thus, the disclosed techniques may enable creating highly configurable, scalable, and extendable nested virtual PLC applications that are combinations of other virtual PLC applications and/or objects. Using the workbench may enable reducing the amount of time and computing resources consumed because a developer of a virtual PLC application may reuse one or more virtual PLC applications programmed to perform a desired function or functions. In some embodiments, once successfully compiled, a virtual PLC application and its objects may not need to be recompiled if the virtual PLC application and its objects are performing their desired function or functions.

In some embodiments, the virtual PLC generator may include operations and/or graphical elements that enable defining properties, attributes, and/or functions of objects. For example, in the programming language C#, Reflection may be used by the virtual PLC generator to describe metadata of types, methods and fields in code. Reflection may be used to obtain data about loaded assemblies, the elements within them like classes, methods and value types used by the objects and/or virtual PLC applications. In some embodiments, the virtual PLC generator may use Reflection to define the inputs and outputs at runtime for the virtual PLC applications that are generated. In some embodiments, the virtual PLC generator includes a compiler capable of compiling computer instructions written in any suitable programming language to check for semantical and/or syntactical errors and to generate executables. An executable may refer to a file that contains a software program capable of being executed or run as a program by a processing device. Executable files may have particular file name extensions, such as .exe, .bat, .com, etc. The compiler may compile the objects to generate a virtual PLC application.

Once the virtual PLC application is generated, a shortcut to the virtual PLC application may be created and added to a virtual tray in a user interface of an operating system executing on a computing device. Adding the shortcut to the virtual tray may provide easy access to the virtual PLC application for a person who desires the computing device to perform the one or more functions implemented by the objects of the virtual PLC application. Instead of having to perform the one or more functions implemented by the objects of the virtual PLC application individually, and having to switch between various screens/user interfaces of the operating system, the shortcut to the virtual PLC application may enable an enhanced user interface and user experience by selecting the virtual PLC application one time to execute to perform the various operations. As such, a user experience using the computing device may be enhanced, thereby providing a technical benefit. Further, computing resources may be reduced because the different applications are not opened that perform the functions implemented by the virtual PLC application, and the screens of those applications are not generated and switched between when the virtual PLC application executes. The GUI provides an enhanced user interface for programming and configuring virtual PLC applications because of its visual convenience of arranging the objects in the second portion of the GUI, among other things.

FIG. 1 illustrates a high-level component diagram of an illustrative system architecture 100 according to certain embodiments of this disclosure. In some embodiments, the system architecture 100 may include a machine 101, a computing device 102, a server 103, and/or a third party database 129 that are communicatively coupled via a network 112. Each of the computing device 101, computing device 102, server 103, and/or machine 101 may include one or more processing devices, memory devices, and network interface devices.

The network interface devices of the computing device 101, computing device 102, server 103, and/or machine 101 may enable communication via a wireless protocol for transmitting data over short distances, such as Bluetooth, ZigBee, near field communication (NFC), etc. Additionally, the network interface devices may enable communicating data over long distances, and in one example, the computing device 101, computing device 102, server 103, and/or machine 101 may communicate with the network 112. Network 112 may be a public network (e.g., connected to the Internet via wired (Ethernet) or wireless (WiFi)), a private network (e.g., a local area network (LAN), wide area network (WAN), virtual private network (VPN)), or a combination thereof.

The computing device 102 may be any suitable computing device, such as a laptop, tablet, smartphone, server, or computer. The computing device 102 may run a virtual PLC generator 105 that is implemented in computer instructions stored on a memory device and that is executed by a processing device. The virtual PLC generator 105 may be a computer application configured to enable designing, configuring, developing, generating, programming, testing, and/or compiling a virtual PLC application 108. The virtual PLC generator 105 includes a graphical user interface (GUI) that enables easy, efficient, user-friendly, and visual development and generation of a virtual PLC application 108. In particular, due to the execution order of PLCs, the GUI includes a vertical section for top-to-bottom execution and one or more horizontal sections for left-to-right execution. The horizontal sections may be encapsulated in, nested in, and/or embedded in the vertical section. The GUI is described further with reference to FIG. 2. A developer may use the GUI to add objects included in a tool box (first portion) of the GUI to a second portion of the GUI representing the virtual PLC application 108. The developer may compile, using the virtual PLC generator 105, the objects to generate the virtual PLC application 108. In some embodiments, the objects in the horizontal section may compile simultaneously while the objects in the vertical section (not included in the horizontal section) may compile sequentially. In some embodiments, the objects in both the horizontal and/or vertical section may compile sequentially or simultaneously.

The machine 101 may include any suitable machine (e.g., an automation device such as an engine, a motor, a conveyor belt, a robot, a pump, a drill, a computer, etc.). The sensor 150 may perform measurements of the machine 101 to obtain raw data 151. The sensor 150 may be any suitable sensor (e.g., a pressure sensor, a proximity sensor, a vibration sensor, a water sensor, a temperature sensor, etc.) capable of performing a measurement to obtain raw data. The raw data 151 may be in a first format.

In some embodiments, logic instructions may be implemented to perform one or functions for each of the objects that are included in the toolbox. One object may be programmed with logic instructions to read the raw data 151 from the sensor 150, perform analysis on the raw data 150 to generate transformed data 111, and store the transformed data 111 in the database 129. Although depicted separately from the computing device 102 and the server, in some embodiments the database 129 may be entirely or partially stored and hosted on the computing device 102 and/or the server. The objects may include logic instructions and configuration instructions that communicatively coupled directly to an address or source of the sensor 150, an address of source of the database 129, or any suitable location where the raw data 151 and/or transformed data 111 may be stored.

The first format of the raw data 151 may be defined in a first schema that specifies the structure of the raw data 151. The raw data 151 may be stored in one or more databases, one or more database collection objects, one or more flat files, one or more CSV file and/or other delimited files, one or more text files, one or more spreadsheet files, or the like.

The objects may include logic instructions that control the machine 101 directly. For example, the logic instructions of certain objects may cause the computing device 102 to transmit control instructions or commands via the network 112 to the machine 101 when the virtual PLC application 108 is executed. The control instructions may cause the machine 101 to actuate, may cause the sensor 150 to perform one or more on-demand measurements, or the like. The objects may be programmed with any suitable repetitive functions or operations implementable by logic instructions.

Once the virtual PLC generator 105 generates the virtual PLC application 108. The virtual PLC application 108 may be stored in memory. A shortcut to the virtual PLC generator 105 may be placed in a virtual tray accessible in a toolbar on a user interface of an operating system executing on the computing device 102. Placing the shortcut in the virtual tray provides quick and easy access to execute the virtual PLC application 108 and improves the user interface, thereby improving a user experience of using the computing device 102.

In some embodiments, one or more servers 103 may form a distributed, grid, and/or peer-to-peer (P2P) computing architecture. Each of the servers 103 may include one or more processing devices, memory devices, data storage, and/or network interface devices. The servers 103 may be in communication with one another via any suitable communication protocol. The servers 103 may be used to execute the virtual PLC generator and distribute a generate virtual PLC application 108 via the network 112. Accordingly, a developer may remotely access the virtual PLC generator 105 using the server 103 to generate the virtual PLC application 108.

Figure 2A:
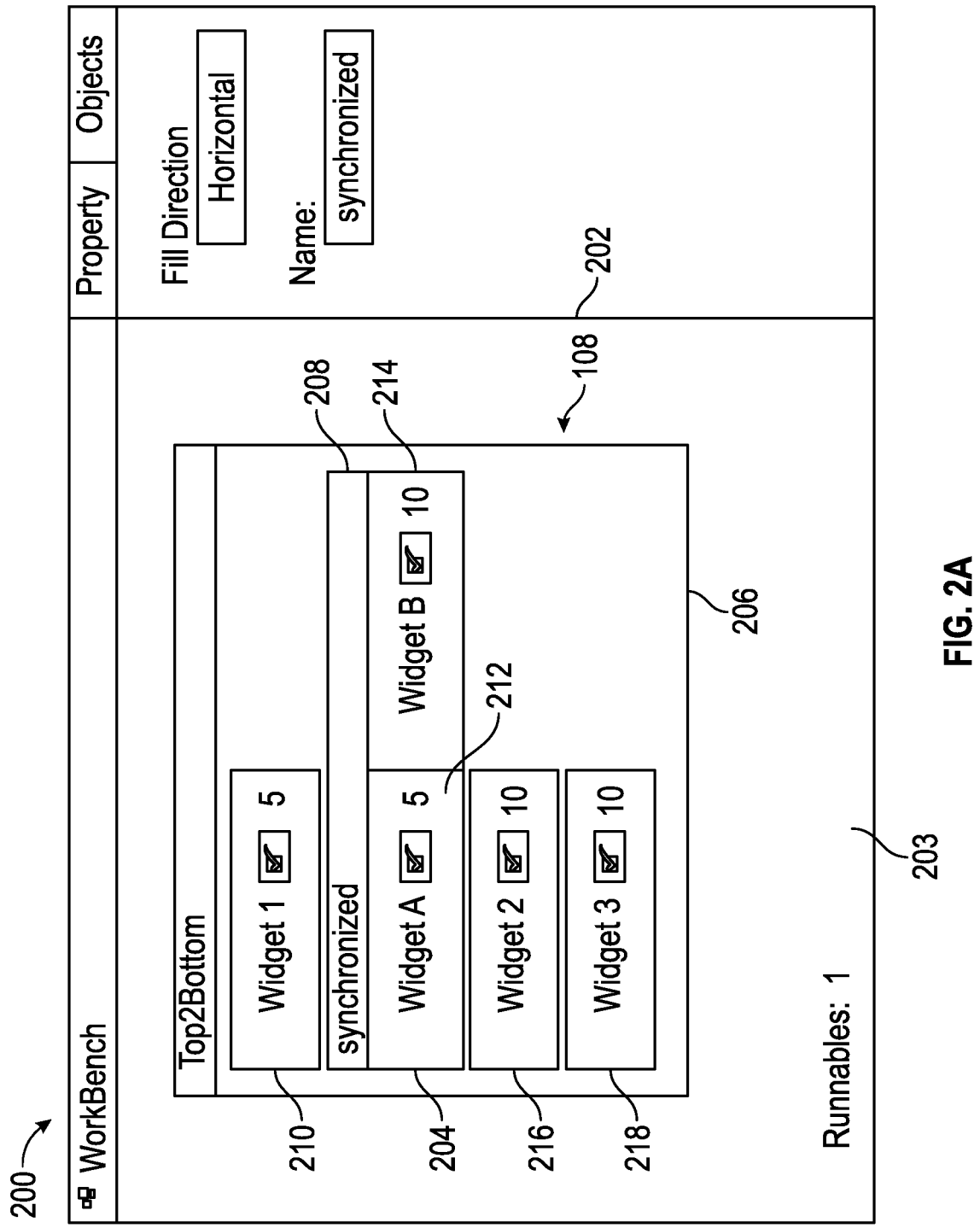
FIG. 2A illustrates a graphical user interface of a virtual programmable logic controller (PLC) generator according to certain embodiments of this disclosure.

FIG. 2A illustrates a graphical user interface (GUI) 200 of a virtual programmable logic controller (PLC) generator 105 according to certain embodiments of this disclosure. The GUI 200 includes a first portion 202 for a toolbox that includes numerous objects and property configurations. As depicted, the property for an object 204 named "synchronized" is currently selected and editable in the toolbox 202. The toolbox presents the fill direction for the object 204 as "horizontal", which means the objects included in the object 204 may execute left-to-right and/or simultaneously.

The GUI 200 also includes a section portion 203 with a vertical section 206 and a horizontal section 208. The horizontal section 208 is encapsulated in the vertical section 206. In some embodiments, a vertical section 206 may be added into the horizontal section 208, such that that vertical section is nested or embedded or encapsulated in the horizontal section 208.

The objects presented and available in the toolbox of the first portion 202 may be selected and inserted into the section portion 203 to develop and build the virtual PLC application 108. As depicted, the enhanced GUI 200 enables enforcing the execution order of a PLC from top-to-bottom and left-to-right by using the vertical section 206 and the horizontal section 208 (e.g., both of which may also be objects). In the depicted virtual PLC application 108, the execution order may be object 210 first that produces an output, then the horizontal section 208 (object 204) using the output from object 210. The execution may proceed to execute the objects 212 and 214 from left-to-right simultaneously in the horizontal section 208 before proceeding to execute the next object 216 in the top-to-bottom sequence. The horizontal section 208 may produce a combined output of the outputs of the objects 212 and 214 that is input into the object 216. After execution of objects 212 and 214 completes, the virtual PLC application 108 may execute object 216 with the combined output. After completion object 216, the virtual PLC application 108 may execute object 218 using the output from object 216.

The virtual PLC generator 105 may compile the objects 210, 212, 214, 216, and 218. If compilation is successful, check marks may be presented for each respective object, as depicted. The toolbox may include a tab for properties where the user may configure time sequencing for the objects. The time sequencing may specify how long the objects should execute, a time at which the objects should execute, and the like. Once compiled, the virtual PLC generator 105 may store an executable file of the virtual PLC application 108 in memory of the computing device 102.

Figure 2B:
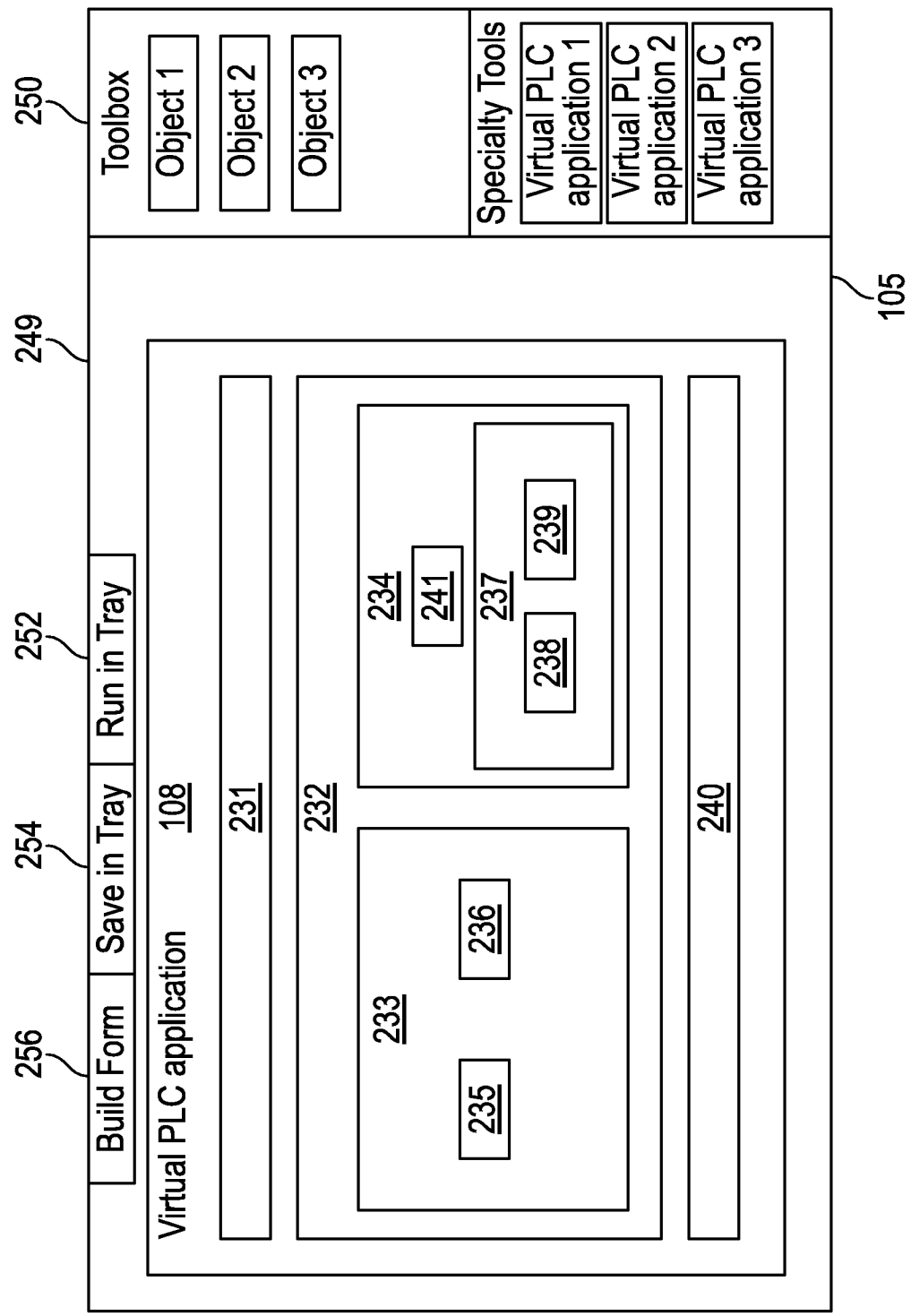
FIG. 2B illustrates a graphical user interface of a PLC generator used to generate a virtual PLC application including nested objects according to certain embodiments of this disclosure.

FIG. 2B illustrates a graphical user interface of a virtual PLC generator 105 used to generate a virtual PLC application 108 including nested objects according to certain embodiments of this disclosure. As depicted, the virtual PLC application 108 includes three objects 231, 232, and 240 that are arranged in a vertical section, as such they will execute from top-to-bottom in sequence. Object 231 executes first, then upon completion, object 232 executes, and when object 232 is finished executing, object 240 executes.

Notably, object 232 is a horizontal section that includes two nested sections 233 and 234. As such, the objects 233 and 234 execute simultaneously with each other. When the horizontal section 233 executes, the objects 235 and 236 execute simultaneously. The object 234 is a vertical section that includes another nested horizontal section (object 237). As depicted, object 234 executes top-to-bottom by executing object 241 first and then object 237 sequentially. Object 237 is a horizontal section that includes objects 238 and 239, which execute simultaneously with each other. Accordingly, the disclosed techniques may enable providing an enhanced graphical user interface for a virtual PLC generator 105 configured to generate virtual PLC applications 108 that have any suitable configured of objects in vertical or horizontal sections to perform a desired operation.

Further, in some embodiments, the user interface may be referred to as a workbench 249 herein. The workbench 249 may include a section where the objects and/or other virtual PLC applications are arranged to generate new virtual PLC application and different sections for a toolbox and/or specialty tools. The enhanced user interface may include a portion 250 for various objects (e.g., tools and specialty tools (also referred to as virtual PLC applications 108) that includes two different sections. A first section corresponds to a toolbox, which includes various objects (e.g., tools). The various objects may be programmed with computer instructions to perform any suitable function and/or logic. For example, there objects for performing looping flow control, conditional Boolean logic flow control, waiting time (e.g., dwell time) before executing an object, an executable software application, a window, an operation that sends data to a database, an operation that copies a file, an operation that selects a particular product to analyze, etc. A second section of the portion 250 may correspond to specialty tools. The specialty tools may be virtual PLC applications 108 that are already compiled and include one or more objects that perform particular functions. For example, the specialty tools may include a database virtual PLC application 108 that enables accessing and/or interfacing with a database, a table display virtual PLC application 108 that enables presenting a table, a folder watched virtual PLC application 108 that enables monitoring a file to determine when it is modified and to copy its contents to another file at a different location to be ingested by a different software application, a file parser virtual PLC application 108 that opens a file and parses its contents to transform the content from a first data format to a second data format compatible with a certain software application, or the like. It should be noted that the virtual PLC applications in the specialty tools section may also be referred to as objects and used to create other virtual PLC applications. The virtual PLC applications in the specialty tools section and/or the objects in the toolbox section may be used in any combination to generate new virtual PLC applications 108. For example, the "Virtual PLC application 1" in the specialty tools section may correspond to object 235 in FIG. 2B, and "Object 1" may correspond to object 236 in FIG. 2B. Accordingly, the enhanced user interface enables generating virtual PLC applications with nested and extendable logic in any suitable configuration.

The virtual PLC generator 105 may also include other graphical elements that enable ease of use and improve a user's experience using the computing device. For example, graphical element 252 (e.g., button), graphical element 254 (e.g., button), and graphical element 256 (e.g., button) may enable the user to perform advanced operations. The graphical element 252 may enable the user to run the virtual PLC application 108 that is presented in the workbench 249 in a tray of the operating system. Selecting such an option may cause an executable representing the virtual PLC application 108 that is already stored at a memory location associated with the tray to be executed. Graphical element 254 may cause the virtual PLC application 108 that is represented, compiled, and created in the workbench 249 to be saved to a memory address that causes the virtual PLC application 108 to be included in the tray. For example, an icon associated with the virtual PLC application 108 may be included in the tray.

Graphical element 256 may enable the user to build a form that is a front-end graphical user interface associated with the virtual PLC application 108. The form may be configured such that it include various input elements, such as text boxes, buttons, drop down selectors, etc. The input elements may be configured such that they call various objects of the virtual PLC application 108 to perform various functions on demand.

In an example implementation, the virtual PLC generator 105 may be used to generate a virtual PLC application 108 that includes objects that enable interoperability between a machine 101 and a third-party application (e.g., a reporting and control application). The objects may be arranged in one or more horizontal sections or vertical sections. For example, the sensor 150 of the machine 101 may obtain various measurements in the form of the raw data 151. The raw data 151 may be saved to a file at a location (e.g., file location, memory address, etc.) on a computer's memory. One object may include logic instructions that specify to monitor the location on the computer's memory to determine when the file is modified (e.g., last saved date changes, memory size of the file increases or decreases, etc.). Responsive to determining the file is modified, the object may open the file and parse the content (e.g., text, audio, video, etc.) of the file. Another object may include logic instructions that determine a format of the content of the file (e.g., fields, attributes, properties, values, tags, etc.) and perform mapping operations that map the format of the content of the file to a second format compatible with the third-party application.

In some embodiments, one or more templates may be obtained and the templates may specify the format of the content (e.g., measurements) of the file. For example, the manufacturer of the sensor 150 may provide the template or the template may be downloaded from any suitable source. In some embodiments, mappings may be determined using the templates where the fields, properties, attributes, tags, etc. in the template are mapped to corresponding fields, properties, attributes, tags, etc. in a data format compatible with the third-party application. For example, the mappings may specify that the field named "measurement_type" is mapped to a field named "mst_typ" in an Extensible Markup Language (XML) file format. In some embodiments, the mappings may be defined by an administrator. In some embodiments, to enable dynamic and a technical improvement, the computing device 102 or the server 103 may utilize an artificial intelligence engine that includes a training engine to generate one or more machine learning models trained to analyze templates and generate mappings to a data format and file compatible with an application (e.g., third-party application). In some embodiments, the artificial intelligence engine is included in the virtual PLC generator 105, and the artificial intelligence engine is implemented in computer instructions stored on one or more memory devices and executed by one or more processing devices.

In some embodiments, the training engine may be capable of generating the one or more machine learning models. The machine learning models may be trained to discover or determine mappings between various file formats or data formats and to perform the mappings to transform a file in a first format to a file in a second format, among other things. In some embodiments, the one or more machine learning models may be trained using training data that includes various templates of first file formats, various templates of second file formats, and mappings between the first file formats and the second file formats. In some embodiments, the machine learning models may be triggered or operated based on the control logic in the objects of the virtual PLC application 108. In some embodiments, the one or more machine learning models may be trained to perform any suitable function or make any suitable determination needed by an object that is implemented in the virtual PLC application 108. For example, the machine learning models may be trained to analyze the content of a file and to make a recommendation. In one example, the data may indicate that a certain threshold measurement in the raw data 151 has been exceeded and that the machine 101 is at risk for shutting down. In such a case, the machine learning models may be trained to determine the threshold has been exceeded and to transmit a recommendation to the computing device 102 to shut down the machine 101. In other embodiments, the machine learning models may be trained to determine the threshold has been exceeded and to transmit a control instruction to the machine 101, where the control instruction causes the machine 101 to shut down. Thus, the machine learning models may be generated and trained to perform control operations using objects included in the virtual PLC application 108.

The one or more machine learning models may be generated by the training engine and may be implemented in computer instructions executable by one or more processing devices of the training engine, the server 103, and/or the computing device 102. To generate the one or more machine learning models, the training engine may train the one or more machine learning models.

The training engine may be a rackmount server, a router computer, a personal computer, a portable digital assistant, a smartphone, a laptop computer, a tablet computer, a netbook, a desktop computer, an Internet of Things (IoT) device, any other desired computing device, or any combination of the above. The training engine may be cloud-based, be a real-time software platform, include privacy software or protocols, and/or include security software or protocols.

The one or more machine learning models may refer to model artifacts created by the training engine using training data that includes training inputs and corresponding target outputs. The training engine may find patterns in the training data wherein such patterns map the training input to the target output and generate the machine learning models that capture these patterns.

The one or more machine learning models may comprise, e.g., a single level of linear or non-linear operations (e.g., a support vector machine [SVM]) or the machine learning models may be a deep network, i.e., a machine learning model comprising multiple levels of non-linear operations. Examples of deep networks are neural networks, including generative adversarial networks, convolutional neural networks, recurrent neural networks with one or more hidden layers, and fully connected neural networks (e.g., each neuron may transmit its output signal to the input of the remaining neurons, as well as to itself). For example, the machine learning model may include numerous layers and/or hidden layers that perform calculations (e.g., dot products) using various neurons. In some embodiments, one or more of the machine learning models may be trained to use causal inference and counterfactuals.

Returning to the description of the example implementation, the object may transform the first format of the file to a second file having the second format compatible with the third-party application and store the second file in a location that is monitored by another object in the virtual PLC generator 105. The object may include any suitable logic instructions, such as a delay timer that causes the object to wait a certain period of time after the second file is saved to the target location. Once the delay timer expires, the object may open the file, parse the content of the file, and store the file to corresponding fields, properties, tables, attributes, tags, etc. in a database associated with the third-party application. Such an example implementation provides a technical solution by using a virtual PLC application 108 that executes in an orderly fashion with a constrained top-to-bottom, left-to-right sequence to extract, transform, and migrate data between computer applications with disparate data formats. The virtual PLC application 108 may function as a process on a computer operating system by actively running and monitoring for its trigger event to occur (e.g., when a file changes) and to electronically begin execution of its objects in their specific order. The virtual PLC application 108 may be disabled by an administrator or user, based on a schedule of operating, or based on a trigger event (e.g., the third-party application is uninstalled, etc.).

It should be understood that the example implementation was for explanatory purposes only, and the disclosure is not limited to the example implementation. Any suitable implementation may be generated using the disclosed techniques. In other words, any virtual PLC application 108 may be created that includes one or more objects programmed to perform any suitable operation (e.g., data creation, data migration, data synchronization, data update, data delete, control operation, decision logic, state machine logic, etc.). For example, the object may be programmed with logic instructions configured to cause the object, when executed by a processing device, to wait a certain amount of time, create a file having a particular type (e.g., XML, JavaScript Object Notation, etc.), send a file, receive a file, transform a file, delete a file, update a file, send a message, create a message, receive a message, perform a control operation, or the like.

Figure 2C:
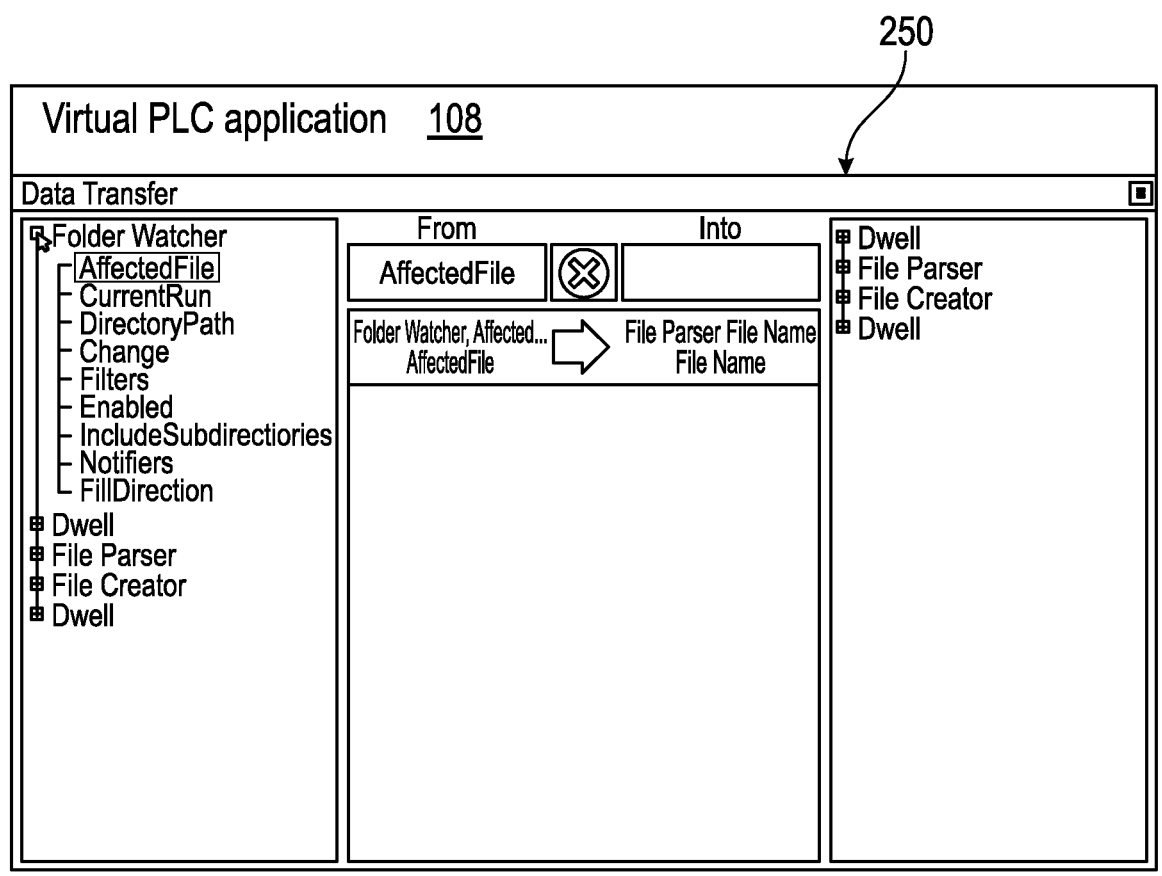
FIG. 2C illustrates an example object for transferring data where the object is included in the virtual PLC application according to certain embodiments of this disclosure.

FIG. 2C illustrates an example object 250 for transferring data where the object is included in the virtual PLC application 108 according to certain embodiments of this disclosure. As depicted, the user interface of the virtual PLC generator 105 provides a screen that depicts which objects and files to map to each other. For example, the screen depicts a file ("AttachedFile") of an object ("Folder Watcher") folder the object is configured to monitor for file changes. In the depicted figure, the user selects "AffectedFile", which is populated in the "From" graphical box, then the user selects which object ("File Parser") to transmit the file to when the file is modified. The user has selected the name of the file to be "FileName". In some embodiments, the user may use the screen to map object interactions in any suitable manner.

As depicted, the "From" graphical box may correspond to an input of the virtual PLC application 108 and the "Into" graphical box may correspond to an output of the virtual PLC application 108. The graphical user interface may enable programming any Input/Output (IO) attributes of a virtual PLC application 108 without actually programming computer instructions. The graphical boxes "From" and "Into" may be associated with computer instructions that map the memory address located at the name of the file in the "From" graphical box to the memory address located at the name of the file in the "Into" graphical box.

Figure 3:
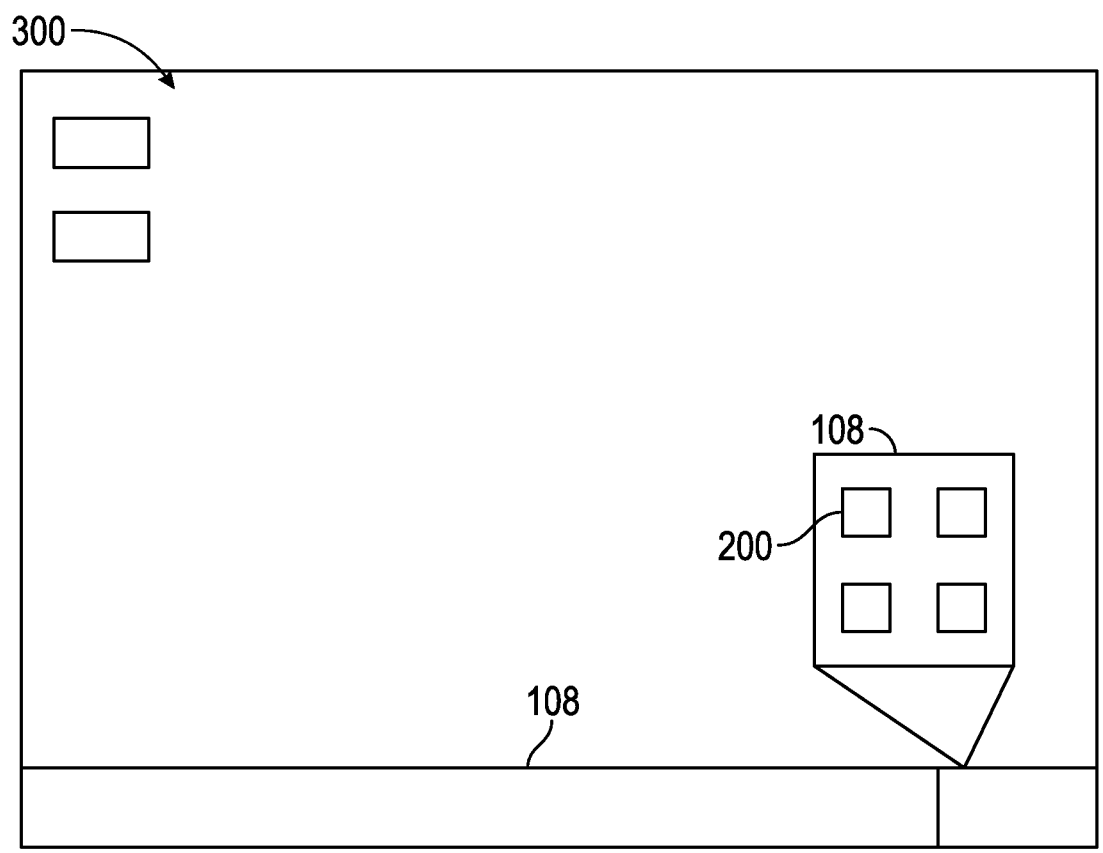
FIG. 3 illustrates a user interface of an operating system including a tray including a shortcut to a virtual PLC application according to certain embodiments of this disclosure.

FIG. 3 illustrates a user interface 300 of an operating system including a virtual tray 304 including a shortcut 304 to a virtual PLC application 108 according to certain embodiments of this disclosure. The virtual tray 302 may be accessed via a toolbar 306 of the user interface 300. The shortcut 304 may be any suitable graphical and/or textual representation or link to a memory location of the executable implementing the virtual PLC application 108.

Figure 4:
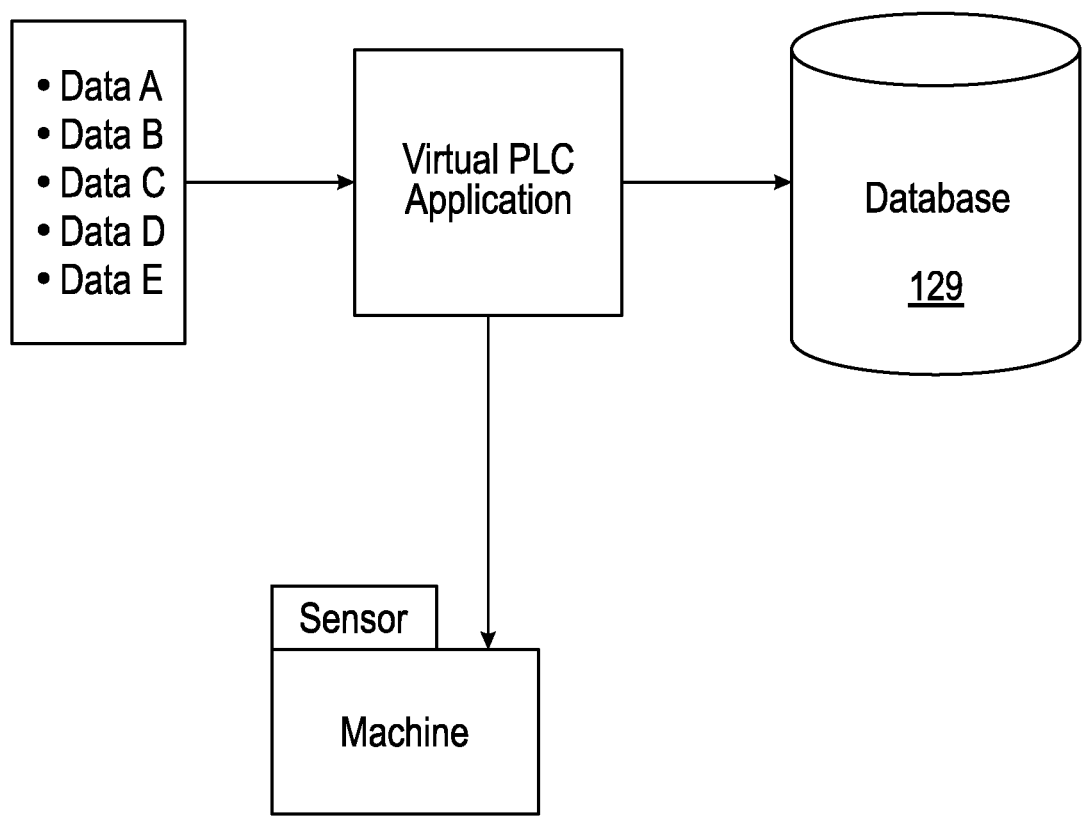
FIG. 4 illustrates virtual PLC application performing various operations according to certain embodiments of this disclosure.

FIG. 4 illustrates virtual PLC application 108 performing various operations according to certain embodiments of this disclosure. The objects included in the virtual PLC application 108 may be communicatively connected and/or coupled to the database 129 (data store) and the machine 101. The objects may be configured (e.g., programmed with logic instructions) to obtain data from the machine 101 (via the sensor 150, a computing device included in the machine 101, a memory device storing data in the machine 101, or the like). The data may be raw data 151 and the virtual PLC application 108 may perform an operation on the data, such as transform the data, and store the data (raw or transformed) in the database 129. The objects may also perform a control operation based on the data or based on logic instructions. For example, the objects may transmit a control instruction to the machine 101 to cause the machine to perform an operation.

Figure 5:
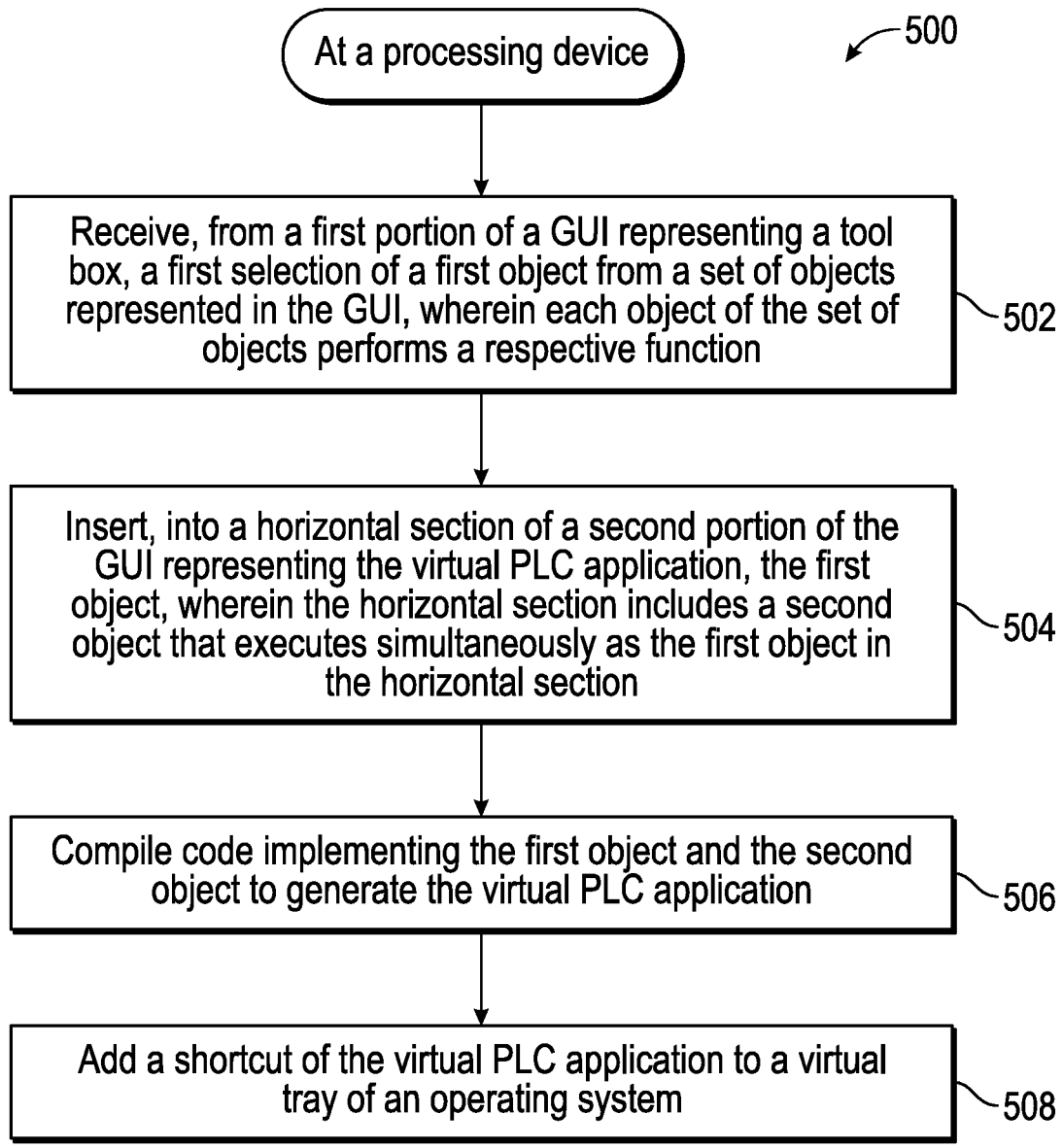
FIG. 5 illustrates example operations of a method for generating a virtual PLC application using a graphical user interface according to certain embodiments of this disclosure.

FIG. 5 illustrates example operations of a method 500 for generating a virtual PLC application using a graphical user interface (GUI) according to certain embodiments of this disclosure. The method 500 may be performed by processing logic that may include hardware (circuitry, dedicated logic, etc.), software, or a combination of both. The method 500 and/or each of their individual functions, subroutines, or operations may be performed by one or more processing devices of a computing device (e.g., any component (computing device 102) of FIG. 1) implementing the method 500. The method 500 may be implemented as computer instructions stored on a memory device and executable by the one or more processing devices. In certain implementations, the method 500 may be performed by a single processing thread. Alternatively, the method 500 may be performed by two or more processing threads, each thread implementing one or more individual functions, routines, subroutines, or operations of the methods.

At block 502, a processing device may receive, from a first portion of the graphical user interface (GUI) representing a tool box, a first selection of a first object from a set of objects represented in the GUI. Each of the set of objects may perform a respective function. In some embodiments, the selection may be a drag-and-drop operation of clicking on the object in the tool box and dragging it into a second portion of the GUI representing the virtual PLC application. In some embodiments, the selection may be a selection of the object in the tool box and then a selection of a graphical element (e.g., button) that causes the selected object to be inserted into the second portion of the GUI.

The objects may be implemented in computer instructions. The objects may be a variable, a data structure, a function, or a method, and as such, may be a value in memory referenced by an identifier. In a class-based object-oriented programming paradigm, an object refers to a particular instance of a class, where the object may be a combination of variables, functions, and data structures. In relational database management, an object may be a table or column, or an association between data and a database entity. In some instances, the objects may be referred to as widgets. Each of the objects may be associated with a set of properties. The properties may include a name of the object, whether the object is to be inserted into a horizontal (left-to-right) or vertical section (top-to-bottom) of a second portion of the GUI representing the virtual PLC application, or the like.

PLC applications may execute in a particular order, and that order may be from left-to-right and top-to-bottom. If there are multiple objects in a horizontal section, the processing device may execute those objects simultaneously, left-to-right, before moving down to execute another object that is vertically lower the objects in the horizontal section. In some embodiments, the objects in the horizontal section may conjunctively generate a single output that is used to input into a next sequential object vertically lower and immediately below the horizontal section.

At block 504, the processing device may insert, into a horizontal section of a second portion of the GUI representing the virtual PLC application, the first object that was selected. The horizontal section may include a second object that executes simultaneously as the first object in the horizontal section. The outputs from each of the first and the second object may be combined in some manner to generate a combined output that is output by the horizontal section. In some embodiments, the output from the first object is input to the second object that generates an output.

In some embodiments, the processing device may receive, from the first portion of the GUI representing the tool box, a second selection of a third object from the set of objects represented in the GUI. The processing device may insert, into the vertical section of the second portion of the GUI, the third object, wherein the third object executes sequentially in the vertical section after the horizontal section executes.

In some embodiments, the first object and the second object may be connected to a data store (e.g., database 129) and a machine 101. The first object and the second object may be configure to obtain data from the machine and store the data in the data store. In some embodiments, the first object and the second object may be communicatively coupled to a machine 101 and are configured to transmit control instructions to the machine 101 to cause the machine 101 to perform an operation. The operation may be an actuation of a part of the machine 101, performing a measurement using the sensor 150, or the like.

In some embodiments, the processing device may receive logic instructions to implement the respective function for each of the objects that are inserted into the second portion of the GUI. The logic instructions may be written in any suitable programming language and may specify the one or more functions for each of the objects to perform. In some embodiments, the processing device may receive an indication of a time sequence for execution of each object of the set of objects. The time sequence may specify how long the object is to execute, a particular time at which the object is to execute, or some combination thereof.

At block 506, the processing device may compile code (computer instructions) implementing the first object, the second object, and the third object to generate the virtual PLC application. Any suitable compiler may be used to compile the code. The virtual PLC application that is generated may be an executable that is stored in memory of the computing device on which the compilation is performed. There may be other objects in the second portion that are implemented in code to generate the virtual PLC application. For example, as depicted in FIG. 2, there may be objects that are above and below the horizontal section and those objects may be located in the vertical section of the GUI in which the horizontal section is encapsulated or embedded. In some embodiments, there may be numerous horizontal sections in the second portion of the GUI and the numerous horizontal sections may include any suitable number of objects. The GUI provides an enhanced user interface for programming and configuring virtual PLC applications because of its visual convenience of arranging the objects in the second portion of the GUI, among other things.

At block 508, the processing device may add a shortcut of the virtual PLC application to a virtual tray of an operating system executing on the computing device 102. As discussed above, generating the virtual PLC application and adding a shortcut to the virtual PLC application in a virtual tray provides numerous benefits over conventional techniques. In some embodiments, the processing device may receive a selection of the shortcut to the virtual PLC application in the virtual tray, and the processing device may execute the virtual PLC application to perform function(s) implemented by the first object and the second object simultaneously. Further, after execution of the first object and the second object, the processing device may execute the third object that is vertically lower and next in a sequential order after the horizontal section is executed.

Figure 6:
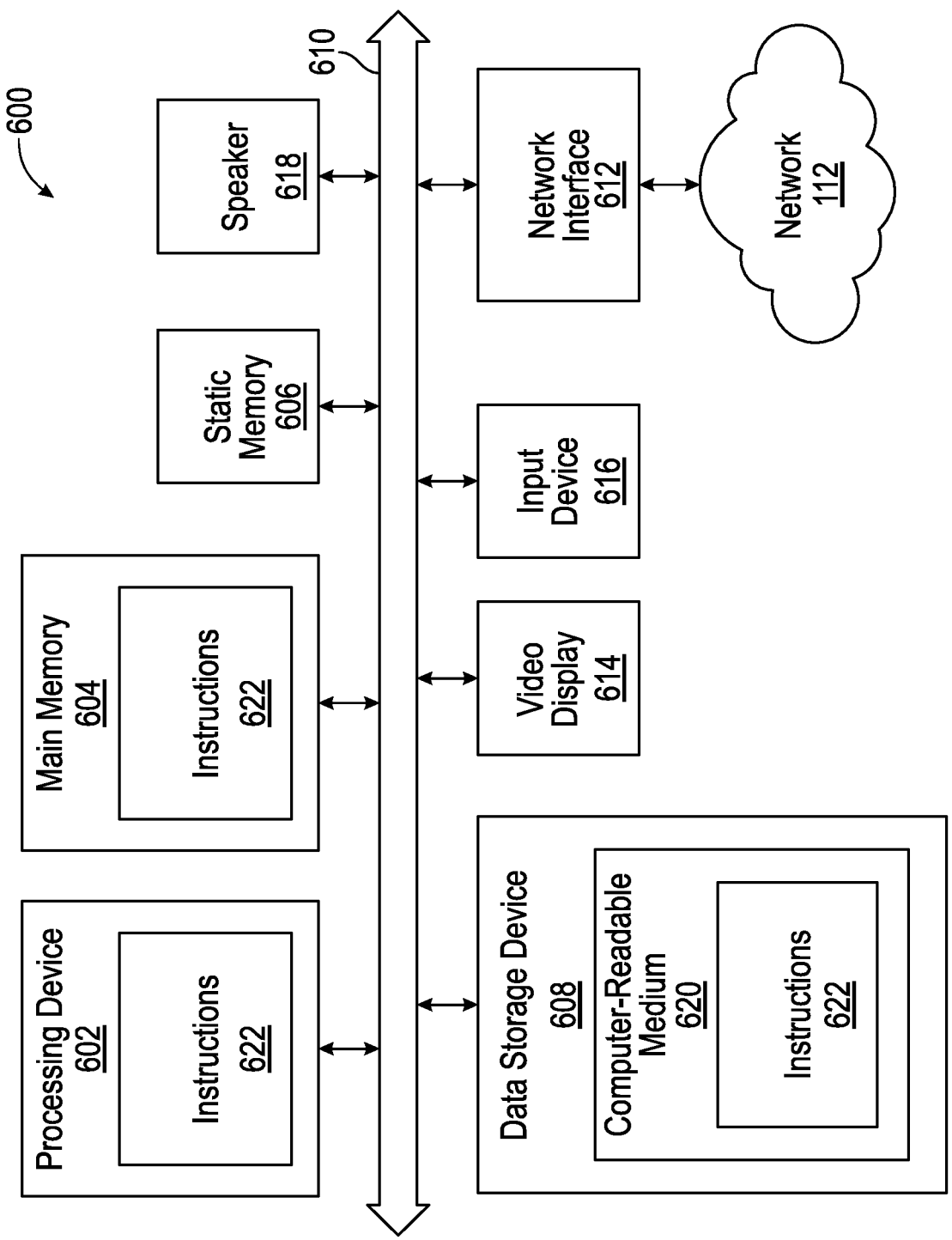
FIG. 6 illustrates an example computer system.

FIG. 6 illustrates an example computer system 600, which can perform any one or more of the methods described herein. In one example, computer system 600 may correspond to the computing device 102, the machine 101, the sensor 150, the server 103, or the database 129 of FIG. 1. The computer system 600 may be capable of executing the virtual PLC generator 105, the virtual PLC application 108, and/or hosting the database 129 of FIG. 1. The computer system 600 may be connected (e.g., networked) to other computer systems in a LAN, an intranet, an extranet, or the Internet. The computer system 600 may operate in the capacity of a server in a client-server network environment. The computer system 600 may be a personal computer (PC), a tablet computer, a wearable (e.g., wristband), a set-top box (STB), a personal Digital Assistant (PDA), a mobile phone, a camera, a video camera, or any device capable of executing a set of instructions (sequential, parallel, or otherwise) that specify actions to be taken by that device. Further, while only a single computer system is illustrated, the term "computer" shall also be taken to include any collection of computers that individually or jointly execute a set (or multiple sets) of instructions to perform any one or more of the methods discussed herein.

The computer system 600 includes a processing device 602, a main memory 604 (e.g., read-only memory (ROM), solid state drive (SSD), flash memory, dynamic random access memory (DRAM) such as synchronous DRAM (SDRAM)), a static memory 606 (e.g., solid state drive (SSD), flash memory, static random access memory (SRAM)), and a data storage device 608, which communicate with each other via a bus 610.

Processing device 602 represents one or more general-purpose processing devices such as a microprocessor, central processing unit, or the like. More particularly, the processing device 602 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 602 may also be one or more special-purpose processing devices such as an application specific integrated circuit (ASIC), a field programmable gate array (FPGA), a digital signal processor (DSP), network processor, or the like. The processing device 602 is configured to execute instructions for performing any of the operations and functions of any method discussed herein.

The computer system 600 may further include a network interface device 612. The computer system 600 also may include a video display 614 (e.g., a liquid crystal display (LCD) or a cathode ray tube (CRT)), one or more input devices 616 (e.g., a keyboard, a touchpad, a microphone, and/or a mouse), and one or more speakers 618 (e.g., a speaker). In one illustrative example, the video display 614 and the input device(s) 616 may be combined into a single component or device (e.g., an LCD touch screen).

The data storage device 616 may include a computer-readable medium 620 on which the instructions 622 embodying any one or more of the methods or functions described herein are stored. The instructions 622 may also reside, completely or at least partially, within the main memory 604 and/or within the processing device 602 during execution thereof by the computer system 600. As such, the main memory 604 and the processing device 602 also constitute computer-readable media. The instructions 622 may further be transmitted or received over a network 112 via the network interface device 612.

While the computer-readable storage medium 620 is shown in the illustrative examples to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

The various aspects, embodiments, implementations or features of the described embodiments can be used separately or in any combination. The embodiments disclosed herein are modular in nature and can be used in conjunction with or coupled to other embodiments, including both statically-based and dynamically-based equipment. In addition, the embodiments disclosed herein can employ selected equipment such that they can identify individual users and auto-calibrate threshold multiple-of-body-weight targets, as well as other individualized parameters, for individual users.

Clause 1. A method for developing a virtual programmable logic controller (PLC) application using a graphical user interface (GUI), the method comprising:

receiving, from a first portion of the GUI representing a tool box, a first selection of a first object from a plurality of objects represented in the GUI, wherein each of the plurality of objects performs a respective function;

inserting, into a horizontal section of a second portion of the GUI representing the virtual PLC application, the first object, wherein the horizontal section comprises a second object that executes simultaneously as the first object in the horizontal section;

compiling code implementing the first object and the second object to generate the virtual PLC application;

adding a shortcut of the virtual PLC application to a virtual tray of an operating system.

Clause 2. The method of any preceding clause, wherein the horizontal section is encapsulated in a vertical section of the second portion of the GUI.

Clause 3. The method of any preceding clause, wherein prior to compiling the code, the method further comprising:

receiving, from the first portion of the GUI representing the tool box, a second selection of a third object from the plurality of objects represented in the GUI;

inserting, into the vertical section of the second portion of the GUI, the third object, wherein the third object executes sequentially in the vertical section after the horizontal section executes.

Clause 4. The method of any preceding clause, wherein the selection comprises a drag-and-drop operation.

Clause 5. The method of any preceding clause, wherein the first object and the second object are connected to a data store and a machine, and the first object and the second object are configured to obtain data from the machine and store the data in the data store.

Clause 6. The method of any preceding clause, wherein the first object and the second object are communicatively coupled to a machine and are configured to transmit control instructions to the machine to cause the machine to perform an operation.

Clause 7. The method of any preceding clause, wherein prior to compiling the code, the method further comprising receiving logic instructions to implement the respective function for each of the objects.

Clause 8. The method of any preceding clause, wherein prior to compiling the code, the method further comprising receiving an indication of a time sequence for execution of each object of the plurality of objects.

Clause 9. The method of any preceding clause, further comprising:

receiving a selection of the shortcut; and executing the virtual PLC application to perform functions implemented by the first object and the second object simultaneously.

Clause 10. A tangible, non-transitory computer-readable medium storing instructions that, when executed, cause a processing device to:

receive, from a first portion of a graphical user interface (GUI) representing a tool box, a first selection of a first object from a plurality of objects represented in the GUI, wherein each of the plurality of objects performs a respective function;

insert, into a horizontal section of a second portion of the GUI representing the virtual PLC application, the first object, wherein the horizontal section comprises a second object that executes simultaneously as the first object in the horizontal section;

compile code implementing the first object and the second object to generate a virtual PLC application;
add a shortcut of the virtual PLC application to a virtual tray of an operating system.

Clause 11. The computer-readable medium of any preceding clause, wherein the horizontal section is encapsulated in a vertical section of the second portion of the GUI.

Clause 12. The computer-readable medium of any preceding clause, wherein prior to compiling the code, the processing device further to:
receive, from the first portion of the GUI representing the tool box, a second selection of a third object from the plurality of objects represented in the GUI;
insert, into the vertical section of the second portion of the GUI, the third object, wherein the third object executes sequentially in the vertical section after the horizontal section executes.

Clause 13. The computer-readable medium of any preceding clause, wherein the selection comprises a drag-and-drop operation.

Clause 14. The computer-readable medium of any preceding clause, wherein the first object and the second object are connected to a data store and a machine, and the first object and the second object are configured to obtain data from the machine and store the data in the data store.

Clause 15. The computer-readable medium of any preceding clause, wherein the first object and the second object are communicatively coupled to a machine and are configured to transmit control instructions to the machine to cause the machine to perform an operation.

Clause 16. The computer-readable medium of any preceding clause, wherein prior to compiling the code, the method further comprising receiving logic instructions to implement the respective function for each of the objects.

Clause 17. The computer-readable medium of any preceding clause, wherein prior to compiling the code, the method further comprising receiving an indication of a time sequence for execution of each object of the plurality of objects.

Clause 18. The computer-readable medium of clause 10, wherein the processing device is further to:
receive a selection of the shortcut; and
execute the virtual PLC application to perform functions implemented by the first object and the second object simultaneously.

Clause 19. A system comprising:
a memory device storing instructions;
a processing device communicatively coupled to the memory device, the processing device executes the instructions to:
receive, from a first portion of a graphical user interface (GUI) representing a tool box, a first selection of a first object from a plurality of objects represented in the GUI, wherein each of the plurality of objects performs a respective function;
insert, into a horizontal section of a second portion of the GUI representing the virtual PLC application, the first object, wherein the horizontal section comprises a second object that executes simultaneously as the first object in the horizontal section;
compile code implementing the first object and the second object to generate a virtual PLC application;
add a shortcut of the virtual PLC application to a virtual tray of an operating system.

Clause 20. The system of any preceding clause, wherein the horizontal section is encapsulated in a vertical section of the second portion of the GUI, and the processing device further to:
receive, from the first portion of the GUI representing the tool box, a second selection of a third object from the plurality of objects represented in the GUI;
insert, into the vertical section of the second portion of the GUI, the third object, wherein the third object executes sequentially in the vertical section after the horizontal section executes.

The invention claimed is:
1. A method for developing a virtual programmable logic controller (PLC) application using a graphical user interface (GUI), the method comprising:
inserting, into a horizontal section of a portion of the GUI representing the virtual PLC application, a first object, wherein the horizontal section comprises a second object that executes simultaneously as the first object in the horizontal section;
compiling code implementing the first object and the second object to generate the virtual PLC application; and
adding a shortcut of the virtual PLC application to a virtual tray of an operating system.

2. The method of claim 1, further comprising receiving, from a first portion of the GUI representing a tool box, a first selection of the first object from a plurality of objects represented in the GUI, wherein each of the plurality of objects performs a respective function.

3. The method of claim 2, wherein the horizontal section is encapsulated in a vertical section of the portion of the GUI.

4. The method of claim 3, wherein prior to compiling the code, the method further comprising:
receiving, from the first portion of the GUI representing the tool box, a second selection of a third object from the plurality of objects represented in the GUI; and
inserting, into the vertical section of the second portion of the GUI, the third object, wherein the third object executes sequentially in the vertical section after the horizontal section executes.

5. The method of claim 1, wherein the selection comprises a drag-and-drop operation.

6. The method of claim 1, wherein the first object and the second object are connected to a data store and a machine, and the first object and the second object are configured to obtain data from the machine and store the data in the data store.

7. The method of claim 1, wherein the first object and the second object are communicatively coupled to a machine and are configured to transmit control instructions to the machine to cause the machine to perform an operation.

8. The method of claim 1, wherein prior to compiling the code, the method further comprising receiving logic instructions to implement the respective function for each of the objects.

9. The method of claim 1, wherein prior to compiling the code, the method further comprising receiving an indication of a time sequence for execution of each object of the plurality of objects.

10. The method of claim 1, further comprising:
receiving a selection of the shortcut; and
executing the virtual PLC application to perform functions implemented by the first object and the second object simultaneously.

11. A tangible, non-transitory computer-readable medium storing instructions that, when executed, cause a processing device to:
- insert, into a horizontal section of a portion of a graphical user interface (GUI) representing a virtual programmable logic controller (PLC) application, a first object, wherein the horizontal section comprises a second object that executes simultaneously as the first object in the horizontal section;
- compile code implementing the first object and the second object to generate the virtual PLC application;
- add a shortcut of the virtual PLC application to a virtual tray of an operating system.

12. The computer-readable medium of claim 11, wherein the processing device is further to receive, from a second portion of the GUI representing a tool box, a first selection of a first object from a plurality of objects represented in the GUI, wherein each of the plurality of objects performs a respective function.

13. The computer-readable medium of claim 12, wherein the horizontal section is encapsulated in a vertical section of the second portion of the GUI.

14. The computer-readable medium of claim 13, wherein prior to compiling the code, the processing device further to:
- receive, from the portion of the GUI representing the tool box, a second selection of a third object from the plurality of objects represented in the GUI; and
- insert, into the vertical section of the second portion of the GUI, the third object, wherein the third object executes sequentially in the vertical section after the horizontal section executes.

15. The computer-readable medium of claim 11, wherein the selection comprises a drag-and-drop operation.

16. The computer-readable medium of claim 11, wherein the first object and the second object are connected to a data store and a machine, and the first object and the second object are configured to obtain data from the machine and store the data in the data store.

17. The computer-readable medium of claim 11, wherein the first object and the second object are communicatively coupled to a machine and are configured to transmit control instructions to the machine to cause the machine to perform an operation.

18. The computer-readable medium of claim 11, wherein prior to compiling the code, the processing device is further to receive logic instructions to implement the respective function for each of the objects.

19. The computer-readable medium of claim 11, wherein the processing device is further to:
- receive a selection of the shortcut; and
- execute the virtual PLC application to perform functions implemented by the first object and the second object simultaneously.

20. A system comprising:
- a memory device storing instructions;
- a processing device communicatively coupled to the memory device, the processing device executes the instructions to:
  - insert, into a horizontal section of a portion of a graphical user interface (GUI) representing a virtual programmable logic controller (PLC) application, a first object, wherein the horizontal section comprises a second object that executes simultaneously as the first object in the horizontal section;
  - compile code implementing the first object and the second object to generate the virtual PLC application; and
  - add a shortcut of the virtual PLC application to a virtual tray of an operating system.

* * * * *